May 23, 1967     K. MAGNUS     3,320,818
PATTERN GENERATING DEVICE
Filed June 25, 1963
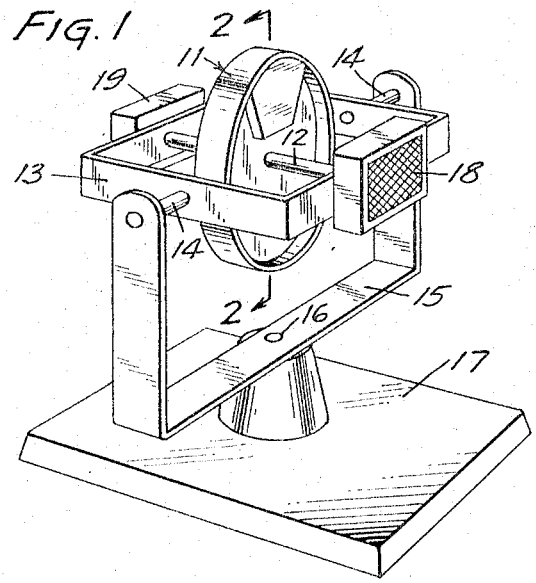
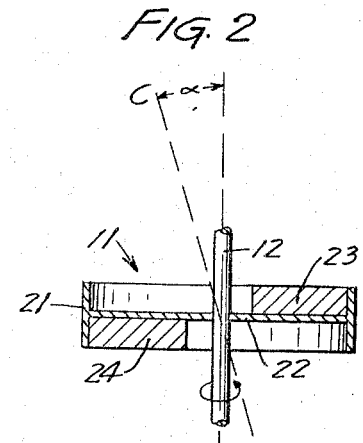
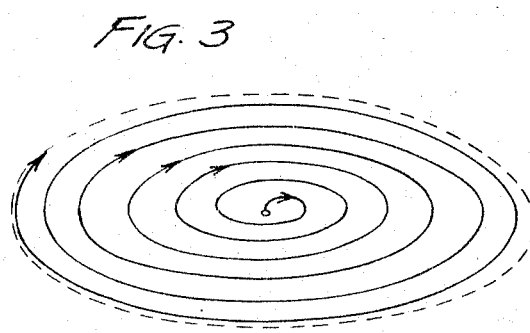
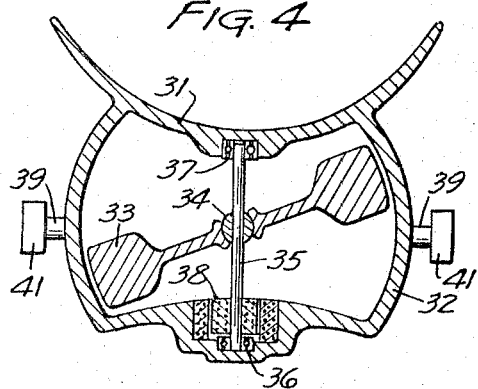
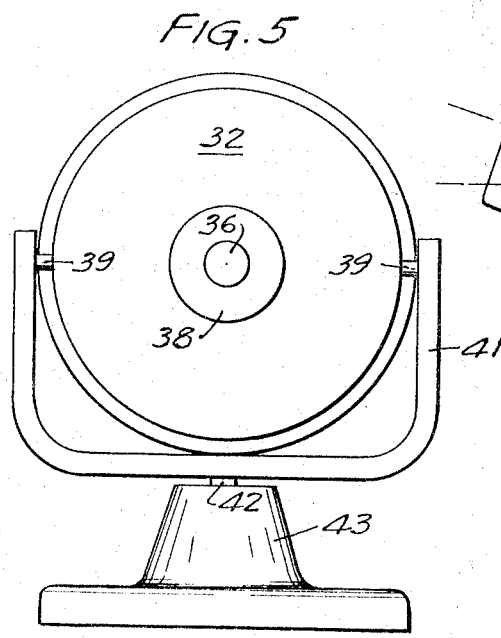
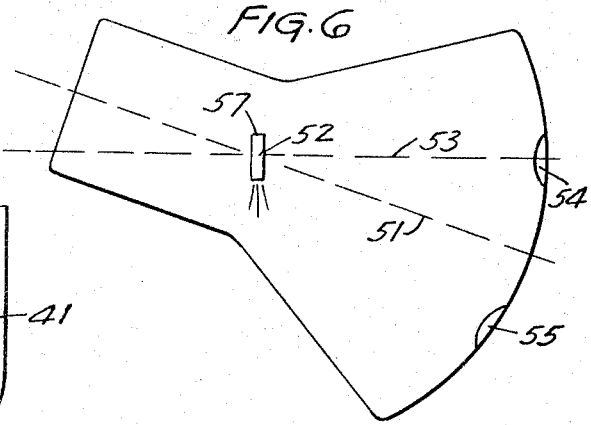
INVENTOR
KURT MAGNUS
BY
*Cuyan Alexander*
ATTORNEY

United States Patent Office 3,320,818
Patented May 23, 1967

3,320,818
PATTERN GENERATING DEVICE
Kurt Magnus, Lawrence, Kans., assignor to The Kansas University Endowment Association, Lawrence, Kans., a non-profit corporation of Kansas
Filed June 25, 1963, Ser. No. 290,409
6 Claims. (Cl. 74—5.22)

The present invention relates to a new and useful pattern generating device. In one aspect this invention relates to a new scanning method and apparatus used therefor. In another aspect this invention relates to a means for using a gyro for generating a pattern.

For radar or infrared or any other radiational systems it is sometimes necessary to swing around the axis of radiation in order to scan a certain area systematically by the beam. The scanning motion is usually produced by servo systems according to certain scanning program. As the masses to be moved are sometimes rather large, the motor has to do a considerable amount of work in producing the programmed motion. Furthermore the reactive forces of the rather complicated motions can be quite large. It is much to be desired to provide a method and device which overcome the above shortcomings of present systems for creating desirable and suitable patterns for purpose of scanning and the like.

It is therefore an object of this invention to provide a new method and a new device to generate a suitable pattern.

Another object is to provide a simplified apparatus to move a working element in a suitable path.

Still another object is to provide a means for easily and adjustably creating a suitable program of scanning.

Yet another object is to provide a new method of use of a gyro.

Various other objects and advantages will become apparent from the accompanying description and disclosure.

In accordance with this invention, a new type gyro is utilized to form a special nutational path of axis of the gyro which axis is connected to a working element or a pattern generating device. The nutational motions are free vibrations of the gyro and therefore no forces are required to set the working element in motion provided the gyro wheel is spinning and the initial conditions as well as the adjustment of the construction are preset to the desired pattern of nutation. The new type gyro which provides the motion to the working element comprises a statically balanced gyro wheel but which is dynamically unbalanced.

The essential elements of the pattern creating device of this invention are diagrammatically illustrated in FIGURE 1 of the drawing.

FIGURE 2 is a cross sectional view of gyro wheel 11 of FIGURE 1 showing the manner of creating static balance of the wheel while at the same time providing dynamic unbalance.

FIGURE 3 is an illustration of a nutational path of an axis of the unbalanced gyro of FIGURE 1 when properly set into motion.

FIGURE 4 of the drawing diagrammatically illustrates a top view, partially in cross section, of a radar or infrared or other type of scanning device embodying the principles and apparatus elements of this invention.

FIGURE 5 is a side view of the gyro device of FIGURE 4 set in a properly free support.

FIGURE 6 is an illustration of the use of the principles of the present invention in a special scanning satellite.

In accordance with FIGURE 1, the essential elements of the pattern creating device comprise a gyro wheel 11, a wheel or rotor axis 12 rotatably journaled to a frame 13 which in turn is rotatably journaled through journal axis 14 to a second frame or gimbal 15. This gimbal is rotatably journaled through the axis 16 to a base 17. The working element 18 of the device may be attached or fixed to any place of the frame 13, for instance to the point of the bearings for the axis 12 as shown in FIGURE 1. A counterweight 19 is attached to the opposite side of frame 13 to the point of the bearings of axis 12, as shown. The working element has—as the frame 13 itself—two degrees of freedom with respect to the base 17. Additional gimbals can be provided for and the working element can be an integral part of or attached to any other of the gimbals without departing from the scope of the invention.

For the most part, the gyro mechanism is constructed similar to conventional gyros. The important difference is the construction of gyro wheel 11. As shown in the cross-sectional view of FIGURE 2, the gyro wheel 11 comprises a rim 21 with a center disk 22 supporting the rim and attached to wheel axis 12. Within the recess formed by the rim 21 two weights 23 and 24 are disposed opposite each other and on opposite sides of disk 22. The wheel is thus statically balanced but dynamically unbalanced. The principal axis inertia is C—C. Wheel axis 12 is separated from the principal axis of inertia C—C by angle α. This angle is usually at least one second of a degree of arc and preferably at least one degree of arc.

The nutation of the gyro is influenced by various factors other than the unbalance of the wheel 11. The type of nutation depends upon the speed of revolution of the gyro wheel and upon the quantity of weights 23 and 24. In addition the nutation will depend upon weights 18 and 19. Weights 18 and 19 may be equal to each other or may be different thus changing the type of nutation and precession. Additional weights may be placed upon gimbal 15 at the point of axis 14 without departing from the scope of this invention.

The working element 18 may be a radar, infrared or other scanning or emitting device, or it may be a vaporising means or a sprinkling means or other devices from which a pattern of emission or reception is desired.

The gyro wheel shown in FIGURES 1 and 2 has two equal principal moments of inertia A and B and a third principal moment of inertia C. For a dynamically balanced wheel one of the principal axes of inertia coincides with wheel axis 12 whereas the two other principal axes of inertia are perpendicular to this axis and are situated in the plane of symmetry of the wheel. The important feature of the present invention is the fact that the gyro wheel has a certain predetermined and adjustable amount of dynamical unbalance, so that the wheel axis 12 is not a principal axis of inertia of the wheel. The wheel axis 12 and this principal axis of inertia are separated by a predetermined angle α.

According to the basic laws of gyros, steady state rotations are possible only around the principal axis of inertia. As wheel axis 12 is not such as axis, free rotations around this axis are not possible. If the wheel is set into motion whereas the frames are fixed this motion cannot continue after the frames are released. The system will make a special type of nutational motion for which a point of the wheel axis 12 describes a certain spiral in space, starting from the initial position. The spiral opens, as this is shown in FIGURE 3, to a certain opening angle $\phi_h$ in the horizontal and $\phi_v$ in the vertical direction. After reaching the maximum deflection, the motion is quite reverse so that the point on the axis under consideration moves in a spiral way back to the center of the pattern. This kind of motion is periodically repeated within a period of Time $T_0$. If the time necessary for running through one single turn of the spiral is $T_1$, then the number of spirals in the whole pattern between the centerpoint and the limiting elliptical curve is $z=T_o/2T$.

The following formulae are useful in determining approximately the pattern described by the point of wheel axis 12 which in a certain sense drives the working element 18:

(1) for the spacial angle $$\phi \approx \alpha\left(1+\frac{A}{C}\right)$$

(2) for the time $$T_o \approx \frac{\pi A}{\omega(A-C)}$$

(3) for the number of spirals $$z \approx \frac{C}{2(A-C)}$$

Given certain value of the principal moment of inertia C the three important parameters $\phi$, $T_o$, $z$ can be adjusted by choosing appropriate values for:

(1) the angle $\alpha$ between the wheel axis and the principal axis of inertia.
(2) the circular frequency $\omega$ of the gyro wheel.
(3) the relation $A/C$ for the principal moment of inertia.

The formulae mentioned are valid for the case of nutational motion of a single rigid body. They can for instance be used directly for the rotational motions of satellites in orbit, if it is desirable for the satellite to scan a certain area. If for terrestrial purposes the gyro together with the radiator-mirror is mounted in a suspension suitable for free motions around all three axes of the system, the device is still more adjustable. If a cardanic suspension with two gimbal rings is used, the inertia of these gimbals has to be taken into account. Considering the moments of inertia $A_1$ and $B_1$ of the inner gimbal ring and $A_2$ of the outer gimbal ring, the shape of the scanned area can be made elliptical. The ratio of vertical and horizontal angles $\phi_v$ and $\phi_h$ is approximately given by the expression $$\frac{\phi_v}{\phi_h} \sqrt{\frac{A+A_1+A_2}{A+B_1}}$$

By choosing appropriate values for $A_2$ the ellipticity of the scanned area can be adjusted according to the requirements.

A further generalization of the motion can be achieved by acting with a certain torque N on an axis perpendicular to the wheel axis of the gyro. This can easily be achieved by adding an eccentric weight to the inner gimbal ring or by magnets or by a motor. Under the influence of this torque the gyro will perform a precessional motion and the average position of the axis of radiation will slowly move around, so that the scanned area can be shifted all over the horizon in a required time. The angular velocity of the precessional motion is $$p \approx = \frac{N}{C\omega}$$

The torque N can even be altered according to a special program or according to the results of scanning in order to stop or slow down the movement of the scanner if there is an object in the scanned area.

In FIGURES 4 and 5 the dynamically unbalanced gyro driving device of this invention is used to generate the scanning pattern in radar scanning apparatus. A radar mirror 31 is combined with a case 32 enclosing a gyro wheel 33. The gyro wheel 33 is fixed to a wheel or rotor axis 35 through an adjustable joint 34. The axis 35 is rotatably held in the case 32 by the two bearings 36 and 37.

The gyro wheel 33 is driven by a conventional electrical motor 38 properly wired and connected to an electrical source (not shown). Gyro wheel 33 is a ring shaped mass, the plane of which can be adjusted by adjustable joint 34 in order to have a certain predetermined angle $\alpha$ between the axis 35 and the principal axis of inertia of the rotating system, which consists of the disk 33 and the axis 35 with the joint 34. As the disk 33 is the heaviest part of the rotor, the principal axis of inertia is situated nearly perpendicular to the plane of symmetry of the disk 33.

The case 32 rotates around journaled axis 39 supported by yoke 41 as shown in FIGURE 5. Yoke 41 rotates around a journaled axis 42 journaled from a third bearing to base 43. The pattern created by the working element 31 of FIGURES 4 and 5 is substantially as described with regard to FIGURES 1 and 3.

FIGURE 6 illustrates the use of the present system in a satellite in orbit where it is desired that the satellite scan a certain area. The axis of symmetry 51 of the satellite passes through the center of gravity 52. Another axis 53 passes through the center of gravity 52 and through the center of a radiation or receiving mirror 54. There can be used more than one mirror in the satellite, for instance a second mirror 55 as shown in FIGURE 6. The mirrors 54 and 55 are fixed in position relative to the construction of the satellite so that the mirror axis is inclined at an angle $\alpha$ with the axis of symmetry or principal axis 51.

The use of two or more radiation or receiving mirrors 54 and 55 is desirable in order to have a more dense scanning of the desired area. If the two mirrors 54 and 55 are fixed opposite to each other as shown, mirror 54 initiates its motion at the center of the scanning spiral whereas mirror 55 scans at the same time the circumference of the area.

A necessary feature of the satellite system shown in FIGURE 6 is a means for imparting a torque to the satellite so that the required initial conditions of spinning can be achieved. This is done by the use of two or more fixed torquers 57 which will give a well-defined initial spin to the satellite.

It is to be understood that various embodiments of construction and various means for applying torque and making automatic adjustments to the system may become obvious to those skilled in the art without the party departing from the scope of the present invention.

Having described my invention I claim:

1. A pattern generating device comprising in combination a gyro wheel, a wheel axis passing through the center of gravity of said gyro wheel, means for providing a predetermined amount of dynamical unbalance of said gyro wheel, support means for providing two degrees of freedom with respect to inertial space for said wheel axis, and a working element associated with said support means, whereby the nutational motion of the running gyro wheel generates a pattern of said working element.

2. A pattern generating device comprising in combination a gyro wheel, a wheel axis passing through the center of gravity of said gyro wheel, means for providing a predetermined amount of dynamical unbalance of said gyro wheel comprising equal weights positioned on said wheel out of line with the center plane of rotation, support means for providing two degrees of freedom with respect to inertial space for said wheel axis, and a working element associated with said support means, whereby the nutational motion of the running gyro wheel generates an elliptical pattern of said working element.

3. A pattern generating device which comprises in combination a gyro wheel, a wheel axis passing through the center of gravity of said gyro wheel, adjustable means for providing a predetermined amount of dynamical unbalance of said gyro wheel, two gimbals for providing two degrees of freedom with respect to inertial space for said wheel axis, and a working element associated with a movable element of the combination, whereby the nutational motion of the running gyro wheel generates a pattern of said working element.

4. The device of claim 3 in which means is provided for exerting a non-counterbalanced force on one end of said wheel axis and in a direction perpendicular to the wheel axis.

5. A pattern generating device which comprises in combination a gyro wheel, a wheel axis passing through the center of gravity of said gyro wheel, adjustable means for providing a predetermined amount of dynamical unbalance of said gyro wheel such that the principal axis of inertia is separated from the wheel axis by at least one second of one degree of arc, means for adjusting the speed of rotation of said wheel, two gimbals for providing two degrees of freedom with respect to inertial space for said wheel axis, and a working element associated with a moving element of the combination, whereby the nutational motion of the running gyro wheel generates a pattern of said working element.

6. The device of claim 5 in which the working element is a radar scanning screen.

References Cited by the Examiner
UNITED STATES PATENTS

| | | | |
|---|---|---|---|
| 1,650,280 | 11/1927 | Koenig | 74—5.4 X |
| 2,078,729 | 4/1937 | Lemoine | 74—5 X |
| 2,596,281 | 5/1952 | O'Brien | 74—61 |
| 3,009,152 | 11/1961 | Gregory et al. | 74—5.22 |

FRED C. MATTERN, Jr., *Primary Examiner.*

BROUGHTON G. DURHAM, *Examiner.*

T. W. SHEAR, J. PUFFER, *Assistant Examiners.*

UNITED STATES PATENT OFFICE
CERTIFICATE OF CORRECTION

Patent No. 3,320,818                                             May 23, 1967

Kurt Magnus

It is hereby certified that error appears in the above numbered patent requiring correction and that the said Letters Patent should read as corrected below.

Column 1, line 68, for "special" read -- spacial --; column 2, line 23, for "axis inertia" read -- axis of inertia --; line 58, for "such as axis" read -- such an axis --; column 3, line 13, formula "(2)" should appear as shown below instead of as in the patent:

$$T_o \approx \frac{\pi A}{\omega(A-C)}$$

line 24, for "moment" read -- moments --; lines 43 and 44 the expression should appear as shown below instead of as in the patent:

$$\frac{\phi_v}{\phi_h} \approx \sqrt{\frac{A+A_1+A_2}{A+B_1}}$$

same column 3, lines 57 and 58, the expression should appear as shown below instead of as in the patent:

$$p \approx \frac{N}{C\omega}$$

Signed and sealed this 9th day of January 1968.

(SEAL)
Attest:

EDWARD M. FLETCHER, JR.                              EDWARD J. BRENNER
Attesting Officer                                        Commissioner of Patent